3,034,745
SPIN-AXIS STABILIZED SPACE VEHICLE STRUCTURE
Donald J. Stewart, 3425 Willow St., National City, Calif.
Filed Jan. 26, 1959, Ser. No. 789,216
3 Claims. (Cl. 244—1)
(Granted under Title 35, U.S. Code (1952), sec. 266)

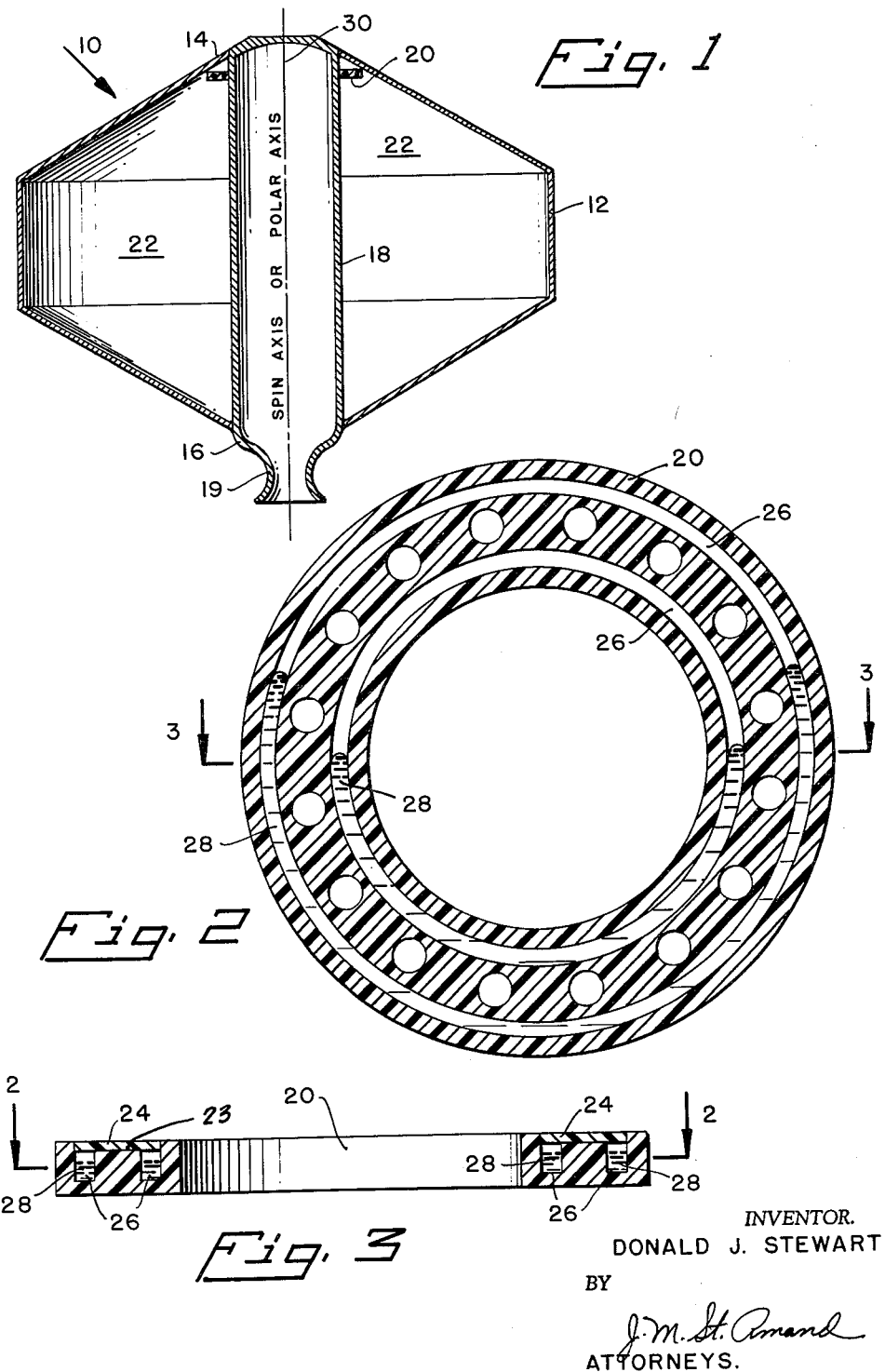

The invention herein described may be manufactured and used by or for the Government of the United States of America for governmental purposes without the payment of any royalties thereon or therefor.

The present invention relates to space vehicles and more particularly to spin-axis stabilization of a space vehicle for eliminating wobbling and nodding which may occur while in flight.

If a space vehicle, constructed such that the moment of inertia as it spins about its polar axis (the desired spin-axis) is greater than the moment of inertia about a transverse axis, while in flight and spinning about its polar axis is subjected, for example, to a momentary unbalancing force, the vehicle will undergo wobbling or nodding movements. In many applications of space vehicles, such spinning action must be provided, and it is desirable that any such wobbling or nodding be quickly eliminated. The present invention provides a spin-stabilized space vehicle structure which effects rapid damping out of such nutational movements, which structure is simple in construction and operation, small in size, inexpensive, and especially suitable for space vehicle applications where such characteristics are desirable or especially necessary. In general, the invention comprises a space vehicle body or framework wherein the moment of inertia of the vehicle as it spins on its polar axis is greater than the moment of inertia about a transverse axis, a motor for propelling the vehicle in flight and generally positioned along the polar axis of the vehicle, and a flat disk-shaped-ring spin stabilizing element which is concentrically mounted about the polar axis (spin-axis) of the vehicle. The spin-stabilizing element is constructed with circular raceways therein containing a dense liquid which partially fills the raceways. Upon rotation of the space vehicle about its polar axis the dense liquid in the raceways is distributed so as to form, in effect, a ring element against the sides of the raceway. Should the polar or spin axis of the vehicle be caused to wobble or nutate due to some unbalancing force against the vehicle, the ring element of dense liquid in the raceways will cause a beating action against the sides of the raceways which acts to rapidly damp out such wobble or nutation.

In accordance with the foregoing, an object of the invention therefore is to provide a space vehicle structure having a stabilized spin-axis.

Another object of the invention is to provide a space vehicle structure wherein any wobbling or nodding of the vehicle as it spins about its polar axis due to momentary unbalancing forces are rapidly eliminated.

Still another object of the invention is to provide a spin-stabilized space vehicle having a moment of inertia as it spins about its polar axis greater than the moment of inertia about a transverse axis and including a spin stabilizing element for rapidly damping out any nutational movements.

A further object of the invention is to provide a space vehicle which has excellent spin stabilization and will operate to rapidly overcome spin-axis unbalancing forces.

Other objects and many of the attendant advantages of this invention will become readily appreciated as the same becomes bettter understood by reference to the following detailed description when considered in connection with the accompanying drawings wherein:

FIG. 1 is a cross-sectional view of an embodiment of the present invention taken along the polar or spin axis of the vehicle;

FIG. 2 is a cross-sectional plan view of the spin-axis stabilizer ring taken along line 2—2 of FIG. 3;

FIG. 3 is a cross-sectional elevation view of the spin-axis stabilizer ring taken along line 3—3 of FIG. 2.

Referring now to the drawings like numerals refer to like parts in each of the figures. Referring more particularly to FIG. 1, 10 denotes a space vehicle structure, having a body 12 which includes a nose portion 14, a rearward portion 16, a propulsion motor portion 18 having a nozzle 19 extending out through rearward portion 16, and a flat ring-shaped spin-stabilizer 20. The structural configuration of spin-stabilized space vehicle 10 may take on a body of any suitable shape or design so long as it is constructed such that the moment of inertia about its polar axis, which is the desired spin-axis of the vehicle, is greater than the moment of inertia about a transverse axis. The interior space 22 within the body 12 of the space vehicle may be used for carrying a power supply and instruments or the like for exploration of outer space and for transmitting information back to earth. However, such instruments and the like must be properly positioned within the vehicle to maintain proper balance and correct moment of inertia about the polar axis as described above. Propulsion motor portion 18 may or may not be included in the space vehicle, or may be of different size or proportions as desired.

In the present embodiment spin-axis stabilizer 20 is securely mounted in the forward portion 14 of the space vehicle and fits about motor portion 18. As illustrated in more detail in FIGS. 2 and 3, spin-axis stabilizer 20 is a substantially flat ring-like member, made of a tough plastic or other suitable material, having a circular recessed portion 23 formed in one face thereof in which is fixed a flat ring-like cover element 24. Stabilizer 20 has a plurality of annular grooves 26 formed therein which are closed and sealed by cover element 24 to form closed annular raceways. Only two grooves or raceways 26 have been illustrated in the drawings, however, any number of such raceways from one or more may be employed depending on the space vehicle in which the spin-axis stabilizer is used. Each of the raceways 26 is partially filled with a predetermined quantity of a relatively dense liquid 28, such as mercury, for example. The flat ring-shaped spin-axis stabilizer member 20 is constructed such that its center of gravity is at the central axis of the ring. Also the space vehicle is constructed such that its center of gravity is along its central or polar axis 30, the desired spin axis of the vehicle. Spin-axis stabilizer 20 is positioned within the space vehicle 10 such that its central axis coincides with the central axis of the vehicle. For the spin-axis stabilizer to be most effective, the ratio of the polar moment of inertia of spinning space vehicle 10 to the transverse moment of inertia thereof should be substantially greater than unit (e.g. 1.35); the exact value of such ratio to cause a maximum damping rate for wobbling of the spin axis will vary with the particular space vehicle structure.

In operation, the space vehicle while in flight is spinning about its polar or spin-axis 30. Centrifugal force acting on the dense liquid masses 28 in raceways 26 causes the dense liquid to become substantially equally distributed about the axis of rotation such as to form a pair of dense liquid rings concentric with the spin-axis of the vehicle. When an impact or other momentary unbalancing force is applied to the space vehicle, which produces a wobbling or nodding moment of the polar-axis, the space vehicle will be caused to undergo nutation. While such unbalance of the spinning space vehicle exists the dense liquid masses in the spin-axis stabilizer shift toward the unbalance so as to actually increase the latter, which action, as will be apparent, is the opposite to a counterbalancing action wherein the counterbalance mass shifts in a direction opposite to the unbalance so as to effect a balance. The mass of the dense liquid employed is made extremely small, however, so that the additional unbalance created will be negligible. Upon the removal of the unbalancing force, the space vehicle will briefly continue to wobble or nutate with decreasing amplitude, the rate of decrease of amplitude being dependent upon the damping provided by stabilizer 20. Where a spin-axis stabilizer is not employed in a spinning space vehicle, the vehicle possibly would dampen out small nutational movements, but only after an extremely long time interval. However, the present space vehicle structure which includes a spin-axis stabilizer increases the damping rate to a point where the damping appears to be instantaneous. Thus, upon removal of an unbalancing force, the dense liquid masses in the stabilizer raceways shift back to a position of substantially equal distribution about the polar axis of the space vehicle to form the aforedescribed rings. As a result of wobbling or nutation of the vehicle, the side walls of the raceways beat against the dense liquid rings with a resultant rapid damping out of such wobbling movements. As previously set forth, the number of raceways, and the total mass of dense liquid (e.g. mercury) employed, necessary to obtain optimum damping rate varies with the geometry of the vehicle, the optimum values being determined experimentally.

A space vehicle in accordance with the aforegoing description may be used for a satellite vehicle, lunar probe, interplanetary vehicle or the like wherein undesirable nutational movements will be rapidly damped out when caused by momentary unbalancing forces.

The above structure has been described for a space vehicle used in actual flights in and beyond the earth's atmosphere. The materials from which a space vehicle structure is made will depend on the particular use to which it will be applied, therefore, it is to be understood that applicant is not to be limited to any particular material since it is obvious that similar structures can be made from a variety of suitable metals, plastics and other materials.

Obviously many modifications and variations of the present invention are possible in the light of the above teachings. It is therefore to be understood that within the scope of the appended claims the invention may be practiced otherwise than as specifically described.

What is claimed is:

1. A spin-axis stabilized space vehicle structure comprising a thin shell structure and a supporting structure within said shell structure, said supporting structure being a propulsion motor in which is defined a polar axis passing through the center of gravity of said vehicle structure, a spin-axis stabilizer mounted on said propulsion motor at an extremity thereof within said shell structure, said shell structure accommodating various instruments therein, said entire vehicle structure being operable to rotate on said polar axis, said vehicle having a mass distribution making the moment of inertia of said vehicle structure about its polar axis greater than the moment of inertia about a transverse axis, said spin-axis stabilizer being a flat ring-shaped element mounted concentric with the vehicle polar axis, said stabilizer element including at least one annular raceway concentric to the polar axis of spin and having a predetermined quantity of liquid partially filling said raceway, whereby rotation of the vehicle about its polar axis will cause the liquid in said raceway to become substantially equally distributed to form a dense liquid ring concentric with the polar axis, and the application of a momentary unbalancing force causing the vehicle to nutate and causing the walls of said raceway to beat against the dense liquid ring with a resultant damping out of such nutation, thus stabilizing the vehicle.

2. A vehicle as in claim 1 wherein said liquid partially filling said raceway is mercury.

3. A vehicle as in claim 1 wherein said stabilizer element has a plurality of raceways formed therein each of which is partially filled with a predetermined quantity of mercury.

References Cited in the file of this patent

UNITED STATES PATENTS

| 2,402,718 | Albree | June 25, 1946 |
| 2,734,384 | Stewart | Feb. 14, 1956 |
| 2,766,626 | Ritter | Oct. 16, 1956 |
| 2,822,755 | Edward et al. | Feb. 11, 1958 |

OTHER REFERENCES

Project Satellite, edited by Kenneth W. Gatland, 1958, p. 123.

Satellites and Spaceflight by Eric Burgess, 1957, p. 57.